May 12, 1970 HIROSHI MIZUNO 3,511,934
AUTOMATIC ANSWERING AND RECORDING APPARATUS HAVING REMOTE CONTROL DEVICE FOR ABSENCE TELEPHONE
Filed May 31, 1967
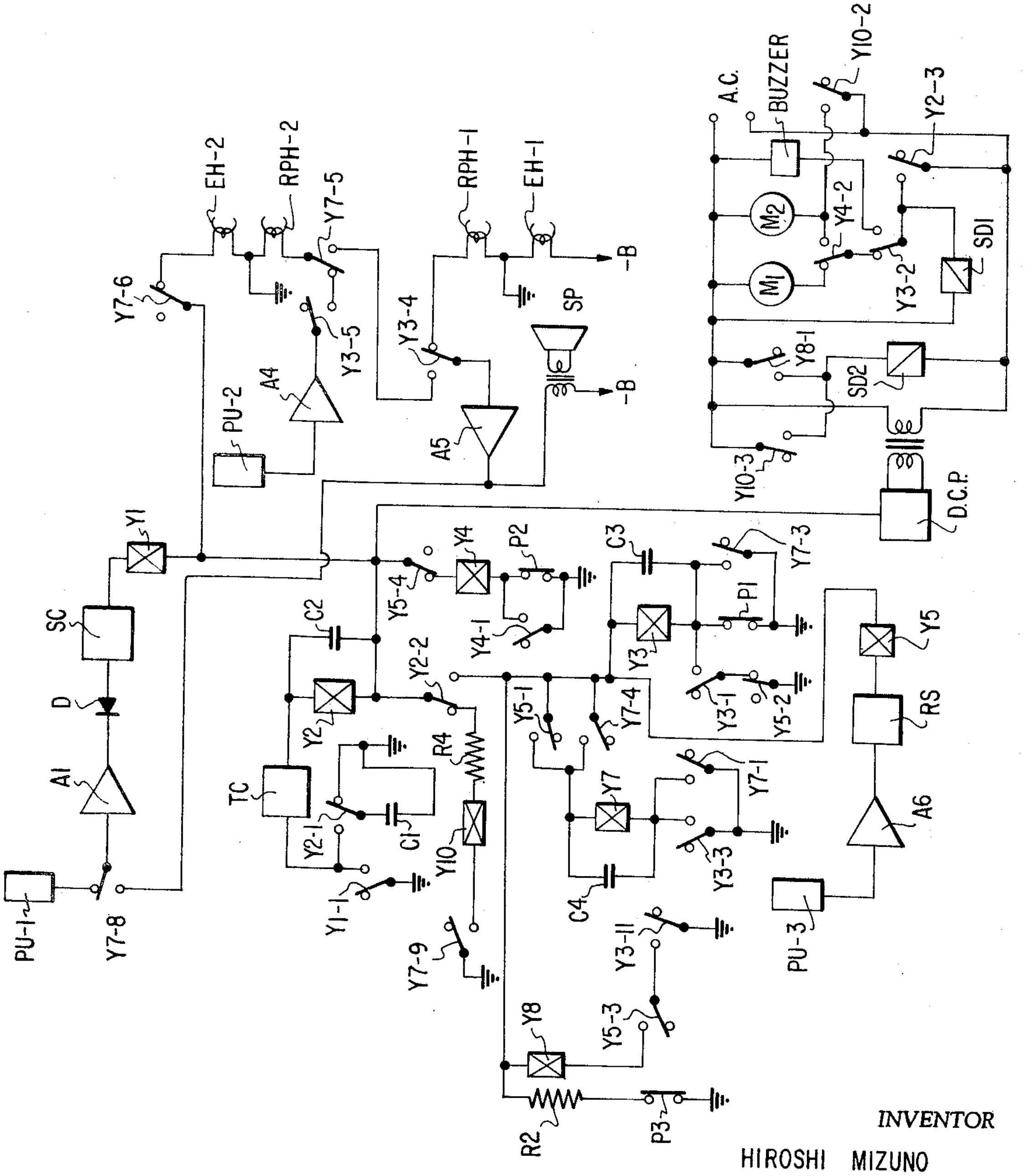
INVENTOR
HIROSHI MIZUNO
BY Sughrue, Rothwell, Mion, Zinn & Macpeak
ATTORNEYS.

3,511,934

AUTOMATIC ANSWERING AND RECORDING APPARATUS HAVING REMOTE CONTROL DEVICE FOR ABSENCE TELEPHONE

Hiroshi Mizuno, Chiba, Japan, assignor to Pioneer Electronic Corporation, Tokyo, Japan Filed May 31, 1967, Ser. No. 642,557
Claims priority, application Japan, May 31, 1966, 41/34,524
Int. Cl. H04m *11/00;* G11b *5/00*
U.S. Cl. 179—6 2 Claims

ABSTRACT OF THE DISCLOSURE

An automatic telephone answering apparatus having remote control means operable by owner to enable playback of prior recorded incoming messages.

BACKGROUND OF INVENTION

This invention relates to an automatic answering and recording apparatus having a remote control device for use by absent owner through which he can listen to an already recorded telephone call from a caller through any telephone by sending remote control signals. In hitherto known automatic telephone answering apparatus, restoration to standby state, even if listening is unfinished, takes place unless the owner of said automatic telephone answering apparatus chimes in at intervals of 10 seconds or so, when he listens to already recorded telephone calls through any convenient telephone when he goes out. Further, in an improved hitherto known apparatus, an automatic telephone answering apparatus must be restored to standby state not only by sending remote operation signals at the beginning of remote listening to said automatic telephone answering apparatus but also by sending remote operation signals at the end of remote listening to the automatic telephone answering apparatus.

For an automatic telephone answering apparatus that requires sending remote operation signals at the end of remote listening, if we hang up the receiver forgetting to send said remote operation signals, then the automatic telephone answering apparatus maintains remote listening, so that the telephone lines of said automatic telephone answering apparatus are kept busy and it is impossible to end such state. In order to improve these defects, a prior application, Ser. No. 627,072, filed Mar. 30, 1967, was directed to an automatic telephone answering apparatus with a remote operation device characterized by recording tone signals for keeping the operation of the apparatus on tape for incoming messages or on another tape in parallel with the recording of incoming messages and having relays operated by playing back said tone signals in order to enable reproduction of said messages. However, this apparatus is not considered economical. Therefore, further improvement for this apparatus has been tried to lead to the present invention. In other words, improvement from the previous invention to the present invention is as follows. In the previous invention, a tone signal for keeping operation is recorded on tape for incoming calls or on another tape in order to obtain sure operation. Although it has great advantage of performing perfect operation, it has such disadvantages that it requires a reproducing head and an erasing head, respectively, and an extra oscillating circuit and amplifying circuit, so that it is expensive to manufacture it. Therefore, it is desirable to eliminate these extra parts and yet provide a safe and sure operation for the purpose of an automatic telephone answering apparatus.

The present invention takes into consideration that a part of recorded incoming messages is made into control signals, instead of the above mentioned tone signal, to keep the apparatus operative at the time of remote listening.

Hereinafter, the present invention will be described referring to an embodiment shown in the accompanying drawing, wherein a circuit diagram of an embodiment of an automatic telephone answering apparatus according to the present invention is shown.

In the drawings, PU–1, PU–2 and PU–3 are the receiving devices, for example, such as a pick-up coil or microphone. The bell signals are picked up by PU–1, incoming messages by PU–2, and remote control signals by PU–3. A1–A6 are amplifiers. Y1–Y10 are relays. Each relay has several contacts. The contacts of relays, for example, are indicated in such a manner that Y1–2 means that the contact is the second contact of the first relay and likewise with all the others. Each contact is shown in FIG. 1 as being in the state of standby. M1 is a motor to drive a tape T1 for outgoing messages and M2 is a motor to drive a tape T2 for incoming messages. SD1 and SD2 are plungers or solenoids and a hook button is released by the action of the plunger SD1, an idler is inserted between the shaft of motor M2 and a reel stand by the action of plunger SD2 to rewind tape T2. RPH–1 and RPH–2 are recording and reproducing heads of which RPH–1 is releated to tape T1 for outgoing messages and RPH–2 is for incoming messages. EH–1 and EH–2 are erasing heads which respectively have relations with each recording and reproducing head, RPH–1 and RPH–2. P1, P2 and P3 are switch devices composed of a pair of electric contacts which are shorted by a conductive piece attached to the end of the tape. P1 is related to tape T1 for outgoing messages, P2 and P3 are related to tape T2 for incoming messages. P2 is shorted when tape T2 is wound up to its end. P3 is shorted when tape T2 is rewound back to its beginning end.

TC is a timer circuit which makes relay Y2 energize when its input terminal is in the grounded state or in the almost grounded state.

The present embodiment of circuit relates to an indirect automatic telephone answering apparatus which is not directly connected with a telephone line, so that it requires input signals receiving devices PU–1, PU–2 and PU–3. However, in a so-called direct connection system which is connected directly to telephone line, PU–1, PU–2 and PU–3 should be replaced by condenser, line transformer, etc. to connect with telephone lines. Similarly, in the present embodiment of circuit, the input signals from PU–1 are amplified by an amplifier A′ to be transferred to later stages, but in the case of a direct connection system, the amplifier can be, of course, omitted.

When the automatic telephone answering apparatus is in the state of standby state and bell signal comes in, said signal is received by receiving device PU–1, amplified with amplifier $A_1$, changed to direct current by rectifier D, and amplified again by direct current amplifier SC to actuate relay Y1. (The drawing shows the relay is in the not-operated state or standby state.) According to the operation of relay Y1, its contact Y1–1 is connected and it simulates a timer circuit TC to operate relay $Y_2$. Contact point $Y_{2-1}$ of said relay $Y_2$ is switched to connect a condenser $C_1$ with the timer circuit TC and to initiate charging for said condenser $C_1$. The timer circuit TC is maintained during this charge period to keep the relay $Y_2$ in operation. The contact $Y_{2-2}$ of said relay $Y_2$ is switched to connect B electric source to circuits of relay $Y_3$, $Y_7$ and $Y_8$. Contact point Y2–3 is connected to motor $M_1$ and plunger $SD_1$ to turn motor $M_1$ and release hook button. Then tape T1 for the outgoing message is operated and played back through head RPH–1 and amplifier A5, and sends out an outgoing message that "There is no one in the office at the present time . . ." through a speaker SP to the caller. When the playing back of the tape T1 is finished, switch device P1 is connected to operate relay Y3, which is self maintained by switching of contact point Y3–1. By switching of contact Y3–2, motor M1 stops its operation and motor M2 turns. According to switching contact Y3–5, receiving device PU–2 and amplifier A4 are connected with head RPH–2 to lead to the state of recording message from a caller into tape T2 for incoming message. If the calling is not by a caller but by the absent telephone owner to listen to an already recorded message from a caller in a remote place, then by sending remote control signals in the state of recording an incoming message, the remote control signals are received by receiving device PU–3, amplified and detected to operate relay Y5. Relay Y7 is energized by contact Y5–1 since contact Y3–3 is already connected. According to the operation of relay Y7, the contact points Y7–1 and Y7–4 are connected, and said relay Y7 is self-maintained. Through operation of relay Y5, contact point Y5–2 is opened, but the condenser C3 is charged so that the discharge electric current flows in relay Y3 to preserve said relay, while relay Y7 is operated and contact Y7–3 is connected to continue preservation of relay Y3. Contact Y7–5 is switched to connect head RPH–2 with amplifier A5. In this case, contact Y3–4 is already switched from head RPH–1. Also contact Y7–6 is opened, so that erasing head EH–2 is not energized and not operated. Contact Y7–8 is switched to amplifier A5 to make a part of the output of the amplifier A5 input for amplifier A1.

On the other hand, contact Y3–7 is connected to relay Y8 during operation of relay Y3, and contact Y5–3 makes relay Y8 energized in accordance with operation of relay Y5, so that the contact Y8–1 is connected to operate plunger SD2 and rewind tape T2 for incoming message. When the tape T2 for incoming message is rewound to the beginning end, then switch device P3 is connected and electric current flows through resistance R2 to branch electric current to relay 8 to stop operation thereof. Contact Y8–1 is restored, operation of plunger SD–2 is finished and tape T2 for incoming message is placed in the state of play back. The sound is played back with head RPH–2 by operation of relay Y7, amplified with an amplifier A5 and announced by a speaker SP. Thus the owner who is calling through a sender can hear the playback sound. A part of the output of the amplifier A5 becomes input for amplifier A1, is commutated aind D.C. amplified to be applied to relay Y1. Contact Y1–1 is connected each time a large signal is applied to the input of the amplifier A1 (the signal cannot be continuous signal because it is voice) and short circuits condenser C1 of the input circuit of timer circuit TC for discharging, then each time preservation period of timer circuit TC is prolonged to maintain operation of relay Y2.

If remote listening to a recorded message is finished, then output of amplifier A5 is extinguished so that the input of relay Y1 is also extinguished and the operation of contact Y1–1 is stopped. Therefore, the timer circuit TC restores relay Y2 after elapse of timer period determined by charging condenser C1. In the present embodiment, after continuation of recording incoming message for nearly one minute after finish of remote listening, it is in the state of standby, so that tape for incoming message runs in vain. However, practically we can prevent the tape for incoming message from running in vain, because we can take into account of length of pauses among spoken voice, so the switching over condenser C1′ (not shown) maintaining timer circuit TC as long as pause periods is easier than increasing one contact of relay Y7. And if several hours after remote listening another remote listening is desired again and the message from a caller which has been recorded during those several hours is desired to listen to, then there is the anxiety of not being able to listen because of the preservation period due to the condenser of this timer circuit TC. If contact Y2–2 is switched to relay Y10 by restoring of relay Y2 at the time of finish of the first remote listening, and relay Y7 is restored in delay due to condenser C4 which is connected in parallel thereto, and contact Y7–9 is kept connected, then said relay Y10 is operated to connect its contacts Y10–2 and Y10–3 to operate plunger SD2 and turn motor M2 for rewinding tape T2 for incoming message as long as preservation period of relay Y7, to the result that said anxiety will be avoided and it is possible to listen to all recorded messages by remote listening again.

As has been described hitherto, in the present invention a part of the play back signal of a recorded incoming message is used as an input signal for a control circuit, relays are operated to maintain operation of the whole apparatus and enable remote listening. Accordingly, it is not necessary to chime as in the case of hitherto known automatic telephone answering apparatus with a remote listening device. Also, the automatic telephone answering apparatus according to the present invention automatically restores to standby state without sending signals for end of remote listening. Further, it does not require any recording of a control signal for maintaining operation into recording tape for an incoming message or another tape, so that the structure of the apparatus is simplified and manufactured inexpensively.

This invention is not to be confined to any strict conformity with the embodiment in the drawings but may be changed or modified so long as such changes or modifications make no material departure from the salient features of the invention as expressed in the appended claims.

What is claimed is:

1. An automatic telephone answering apparatus with a remote control device, which comprises a circuit for receiving bell signals, a device for playing back and sending an outgoing message, a device for receiving, recording and playing back an incoming message, driving means for said devices and a circuit for receiving remote control signals, a control circuit operated by said bell signal circuit and said circuit for receiving remote control signals in order to control said recording and playing back device and said driving means, said control circuit including a timer circuit operated by said circuit for receiving a remote control signal, utilizing a part of the playing back signal of an incoming message as input for said circuit for receiving a bell signal, said circuit for receiving a bell signal allowing said control circuit to continue its operation for maintaining the remote listening state until the end of the playing back of said incoming message, and upon termination of the operation of said control circuit said driving means being automatically energized to rewind a portion of said incoming message before said automatic telephone answering apparatus returns to standby to thereby enable a subsequent remote listening of further recorded incoming messages.

2. An automatic telephone answering apparatus with a remote control device according to claim 1, which comprises respectively at least one relay in said circuit for receiving a bell signal and the circuit for receiving remote control signal, said control circuit comprising a group of relays, a contact of a relay in said circuit for receiving a bell signal initiating the start of a timer circuit, relays in said circuit for receiving a remote control signal stimulating control circuits except said timer circuit, a head for playing back incoming message, means connecting said head with a playing back and amplifying circuit by operation of said control circuit, a part of output of said amplifying circuit being utilized as an input for said circuit for receiving a bell signal in order to continue operation of said timer circuit.

References Cited

UNITED STATES PATENTS 3,293,365 12/1966 Mitsui ---------------- 179—6

JAMES W. MOFFITT, Primary Examiner
J. ROSENBLATT, Assistant Examiner

U.S. Cl. X.R.

179—100.1